(12) United States Patent
Bhagwan et al.

(10) Patent No.: US 10,803,275 B2
(45) Date of Patent: *Oct. 13, 2020

(54) DECONVOLUTION OF DIGITAL IMAGES

(71) Applicant: International Business Machines Corporation, Armonk, NY (US)

(72) Inventors: Varun Bhagwan, Los Gatos, CA (US); Timothy Liu, Berkeley, CA (US); Justin Ormont, Beaver Dam, WI (US); Heather Underwood, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,457

(22) Filed: Oct. 4, 2018

(65) Prior Publication Data

US 2019/0042817 A1 Feb. 7, 2019

Related U.S. Application Data

(63) Continuation of application No. 15/283,817, filed on Oct. 3, 2016, now Pat. No. 10,140,495, which is a
(Continued)

(51) Int. Cl.
*G06K 9/42* (2006.01)
*G06K 7/14* (2006.01)
(Continued)

(52) U.S. Cl.
CPC ......... *G06K 7/146* (2013.01); *G06K 9/00255* (2013.01); *G06K 9/36* (2013.01);
(Continued)

(58) Field of Classification Search
None
See application file for complete search history.

(56) References Cited

U.S. PATENT DOCUMENTS

| 5,208,766 A | 5/1993 | Chang |
| 5,390,259 A * | 2/1995 | Withgott .............. G06F 40/103 |
| | | 382/173 |

(Continued)

FOREIGN PATENT DOCUMENTS

| EP | 0943132 B1 | 12/2001 |
| EP | 0978087 B1 | 6/2009 |
| GB | 2381637 A | 5/2003 |

OTHER PUBLICATIONS

Restoration of out of focus—Filter, Addiati et al., I EEE, 978-0-7695-3959-1,2009, pp. 133-137 (Year: 2009).*

(Continued)

*Primary Examiner* — Jayesh A Patel
(74) *Attorney, Agent, or Firm* — Steven L. Nichols; Fabian VanCott

(57) ABSTRACT

A method for deconvolution of digital images includes obtaining a degraded image from a digital sensor, a processor accepting output from the digital sensor and recognizing a distorted element within the image. The distorted element is compared with a true shape of the element to produce a degrading function. The degrading function is deconvolved from at least a portion of the image to improve image quality of the image. A method of indirectly decoding a barcode includes obtaining an image of a barcode using an optical sensor in a mobile computing device, the image comprising barcode marks and a textual character. The textual character is optically recognized and an image degrading characteristic is identified from the textual character. Compensating for the image degrading characteristic renders previously undecodable barcode marks decodable. A system for deconvolution of digital images is also included.

20 Claims, 10 Drawing Sheets

Related U.S. Application Data continuation of application No. 14/254,705, filed on Apr. 16, 2014, now Pat. No. 9,508,116, which is a continuation of application No. 12/903,072, filed on Oct. 12, 2010, now Pat. No. 8,792,748.

(51) Int. Cl.

| | | |
|---|---|---|
| *G06K 9/36* | (2006.01) | |
| *G06T 5/00* | (2006.01) | |
| *G06K 9/00* | (2006.01) | |
| *G06K 9/46* | (2006.01) | |
| *G06T 3/00* | (2006.01) | |

(52) U.S. Cl.
CPC ............ *G06K 9/46* (2013.01); *G06T 3/0056* (2013.01); *G06T 3/0068* (2013.01); *G06T 5/003* (2013.01); *G06K 2009/363* (2013.01); *G06K 2209/01* (2013.01); *G06T 2207/10004* (2013.01); *G06T 2207/10024* (2013.01)

(56) References Cited

U.S. PATENT DOCUMENTS

| | | | | |
|---|---|---|---|---|
| 5,414,782 | A | 5/1995 | Carasso | |
| 5,647,023 | A | 7/1997 | Agazzi | |
| 5,929,420 | A | 7/1999 | Cai | |
| 6,304,667 | B1 | 10/2001 | Reitano | |
| 6,366,696 | B1* | 4/2002 | Hertz | G06K 9/32 |
| | | | | 382/181 |
| 6,571,021 | B1 | 5/2003 | Braudaway | |
| 6,876,763 | B2* | 4/2005 | Sorek | G06K 9/209 |
| | | | | 348/222.1 |
| 7,346,222 | B2* | 3/2008 | Lee | G06K 9/40 |
| | | | | 382/260 |
| 7,416,125 | B2* | 8/2008 | Wang | G06K 7/1093 |
| | | | | 235/462.01 |
| 7,471,828 | B1 | 12/2008 | Meier | |
| 7,480,408 | B2* | 1/2009 | Jun | G06K 9/6255 |
| | | | | 382/176 |
| 7,575,171 | B2 | 8/2009 | Lev | |
| 7,660,478 | B2* | 2/2010 | Steinberg | H04N 5/23248 |
| | | | | 348/208.99 |
| 8,068,668 | B2 | 11/2011 | Hong | |
| 8,068,687 | B2* | 11/2011 | Nishiyama | G06K 9/00228 |
| | | | | 348/169 |
| 8,199,100 | B1* | 6/2012 | Barnhoefer | G09G 3/3426 |
| | | | | 345/100 |
| 8,203,615 | B2 | 6/2012 | Wang | |
| 8,437,551 | B2 | 5/2013 | Noonan et al. | |
| 8,596,540 | B2* | 12/2013 | Adelmann | G06K 7/14 |
| | | | | 235/462.25 |
| 8,792,748 | B2* | 7/2014 | Bhagwan | G06K 7/146 |
| | | | | 382/275 |
| 9,508,116 | B2* | 11/2016 | Bhagwan | G06K 7/146 |
| 9,704,052 | B2* | 7/2017 | Fujieda | G06K 9/3283 |
| 10,140,495 | B2* | 11/2018 | Bhagwan | G06K 7/146 |
| 2001/0048764 | A1 | 12/2001 | Betrisey | |
| 2002/0102966 | A1 | 8/2002 | Lev et al. | |
| 2003/0184663 | A1* | 10/2003 | Nakano | H04N 1/4092 |
| | | | | 348/241 |
| 2004/0081342 | A1 | 4/2004 | Sato | |
| 2006/0177145 | A1* | 8/2006 | Lee | G06T 5/003 |
| | | | | 382/255 |
| 2006/0187308 | A1 | 8/2006 | Lim et al. | |
| 2006/0213999 | A1* | 9/2006 | Wang | G06K 7/1093 |
| | | | | 235/462.25 |
| 2007/0175995 | A1 | 8/2007 | Maniwa et al. | |
| 2008/0175508 | A1 | 7/2008 | Bando | |
| 2008/0240607 | A1 | 10/2008 | Sun et al. | |
| 2008/0267504 | A1* | 10/2008 | Schloter | G06F 16/9554 |
| | | | | 382/181 |
| 2009/0028443 | A1* | 1/2009 | Chen | G06K 9/6292 |
| | | | | 382/224 |
| 2009/0212113 | A1* | 8/2009 | Chiu | G06K 7/14 |
| | | | | 235/462.41 |
| 2009/0244300 | A1* | 10/2009 | Levin | G03B 17/00 |
| | | | | 348/208.5 |
| 2009/0277962 | A1* | 11/2009 | McCloskey | H04N 5/23267 |
| | | | | 235/462.01 |
| 2009/0316950 | A1* | 12/2009 | Alasia | G06K 9/00577 |
| | | | | 382/100 |
| 2010/0086206 | A1* | 4/2010 | Hong | G06T 7/44 |
| | | | | 382/168 |
| 2010/0142845 | A1* | 6/2010 | Rybkin | G06K 9/4642 |
| | | | | 382/263 |
| 2010/0187311 | A1* | 7/2010 | van der Merwe | G06T 7/136 |
| | | | | 235/462.01 |
| 2010/0189367 | A1* | 7/2010 | van der Merwe | G06K 9/183 |
| | | | | 382/217 |
| 2010/0208996 | A1* | 8/2010 | Noonan | G06T 5/003 |
| | | | | 382/177 |
| 2010/0295939 | A1* | 11/2010 | Hooning | G01N 21/01 |
| | | | | 348/131 |
| 2010/0303356 | A1* | 12/2010 | Fosseide | G06K 9/346 |
| | | | | 382/182 |
| 2010/0329582 | A1* | 12/2010 | Albu | G06T 5/10 |
| | | | | 382/255 |
| 2011/0034176 | A1 | 2/2011 | Lord et al. | |
| 2011/0038548 | A1 | 2/2011 | Rezazadeh | |
| 2011/0044554 | A1 | 2/2011 | Tian et al. | |
| 2011/0090352 | A1 | 4/2011 | Wang | |
| 2011/0222794 | A1* | 9/2011 | Galic | G06K 9/42 |
| | | | | 382/298 |
| 2011/0268360 | A1* | 11/2011 | Antonijevic | G06K 9/344 |
| | | | | 382/177 |
| 2011/0299775 | A1 | 12/2011 | Kluzner | |
| 2013/0051683 | A1* | 2/2013 | Tanaka | G06T 5/003 |
| | | | | 382/203 |
| 2013/0129152 | A1* | 5/2013 | Rodriguez Serrano | |
| | | | | G06K 9/00791 |
| | | | | 382/105 |

OTHER PUBLICATIONS

Camera-based-survey, Liang et al, IJDAR, 2005, pp. 1-21 (Year: 2005).*
A bayesian—barcodes., Tekin et al., IEEE, 978-0-7695-3651-4, 2009, pp. 61-67 (Year: 2009).*
Text degradations and OCR training., Elisa H. Barney Smith et al., Researchgate, 2005, pp. 1-5 (Year: 2005).*
Smith et al., Text Degradations and OCR Training; IEEE, 1520-5263; 2005; pp. 1-6.
J. Liyanage; Efficient Decoding of Blurred, Pitched, and Scratched Barcode Images; Second International Conference on Industrial and Information Systems (ICIIS 2007); Zone24x7 Inc.; janakal@zone24x7.com; Aug. 2007; pp. 1-6.
Li, T.H. & Lf f, K.S. (Jul. 21-23, 1997); Deblurring Two-Tone Images by a Joint Estimation Approach Using Higher-Order Statistics; Proceedings of the 1997 IEEE Signal Processing Workshop on Higher-Order Statistics (SPW-HOS 97); 108-111.
Qi, X.Y. et al (2005); Motion Deblurring for Optical Character Recognition; IEEE, Proceedings of the 2005 Eight International Conference on Document Analysis and Recognition (ICDAR '05); 389-393.
Liu, N.Z. ET Sun, H. (2008); Deconvolution of the Two-Dimensional Bar Code Based on Binary Constraint; IEEE, Proceedings of the International Conference on Computer Science and Software Engineering; vol. 01; 80G809.
Donato, V. et al (Oct. 2007); Extended Depth-of-Field Optical Reader Exploiting Digital Image Deconvolution; 2007 IEEE Workshop on Automatic Identification Advanced Technologies; AUTOID 2007; IEEE 07EX1818C; 146-149.
Addiati et al; Restoration of Out of Focus Filter; IEEE, 978-0-7695-3959-1; 2009; pp. 133-137.
Liang et al; Camera-Based Survey; IJDAR; 2005; pp. 1-21.
Tekin et al; A Bayesian—Barcodes; IEEE, 978-0-7695-3651-4; 2009; pp. 61-67.

(56) References Cited

OTHER PUBLICATIONS

Chu et al; Extracting Barcodes—Phones; IEEE, 1-4244-1017; 2007; pp. 2062-2065.
Yahyanejad et al; Removing Motion Blur from Barcode Images; IEEE, 978-4244-7030-3; 2010; pp. 41-46.

* cited by examiner

DECONVOLUTION OF DIGITAL IMAGES

BACKGROUND

The quality of digital images taken with optical cameras can be degraded by a number of factors, including motion blur, lack of focus, poor lighting, distortion, or other artifacts. One process for identifying and correcting the degradation of images is deconvolution. Deconvolution attempts to quantify one or more factors which degrade the image and then mathematically reverse the effects these factors have on the image. However, because of the difficulty in accurately quantifying the factors which degrade the image, deconvolution is often mathematically intense process which works best with highly calibrated systems which are used in controlled environments. The proliferation of inexpensive digital cameras and cameras on mobile devices has dramatically increased the number of images taken. However, it is particularly difficult to apply blind image deconvolution on these platforms because of the lack of available computing power, the wide range of imaging environments, optical limitations, and other factors.

BRIEF SUMMARY

A method for deconvolution of digital images includes obtaining a degraded image from a digital sensor, a processor accepting output from the digital sensor and recognizing a distorted element within the degraded image. The distorted element is compared with a true shape of the element to produce a degrading function. The degrading function is deconvolved from at least a portion of the image to improve image quality of the degraded image.

A method of indirectly decoding a barcode includes obtaining an image of a barcode using an optical sensor in a mobile computing device, the image comprising barcode marks and a textual character. The textual character is optically recognized and an image degrading characteristic is identified from the textual character. Compensating for the image degrading characteristic renders previously undecodable barcode marks decodable.

A system for deconvolution of digital images includes an optical sensor for acquiring an image of a scene and an element identification module for identification of distorted elements within the image. A degrading function calculator is used to calculate a degrading function based on the difference between portions of the image which contain the distorted elements and undistorted elements obtained from a known element library. A deconvolution module deconvolves the degrading function from at least a portion of the image and outputs an enhanced image A computer program product for image enhancement by deconvolution includes computer readable program code which is configured to recognize a distorted element within an image and compare the distorted element with a corresponding undistorted element to produce a degrading function. The computer readable program code deconvolves the degrading function from at least a portion of the image to produce an enhanced image.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
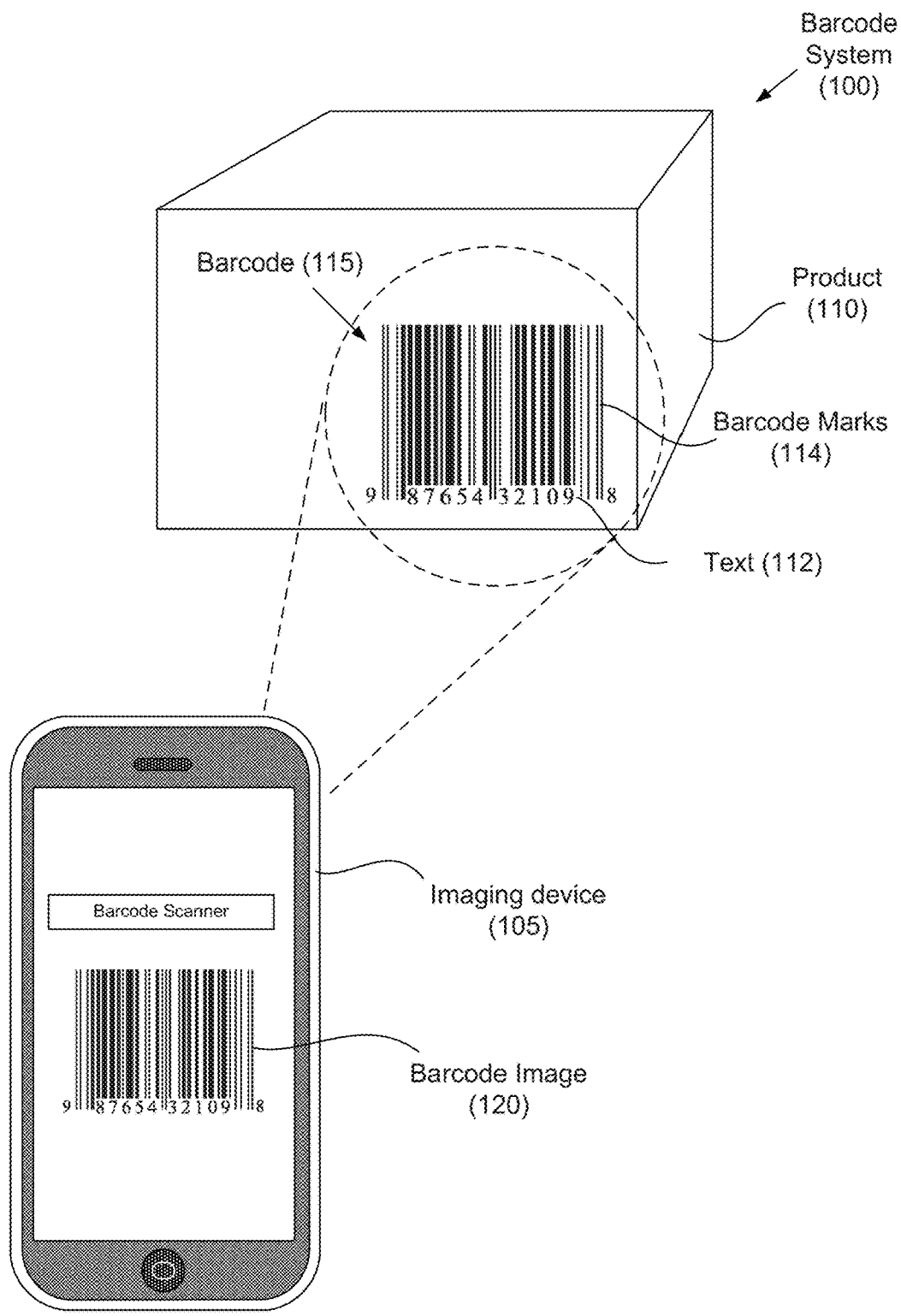
FIG. 1A is a diagram of an illustrative mobile barcode scanning system, according to one embodiment of principles described herein.

The present specification discloses methods for implementing deconvolution images in an accurate and efficient manner using identifiable elements within an image. One example of an identifiable element is text in an image which can be interpreted by optical character recognition. The optically recognized characters serve as the "true image." The difference between the "true image" and the portions of the image from which the optically recognized characters were extracted are used to quantify the degradation function of the image. This degradation function is then deconvolved from the image. This method of quantifying the degradation function of the image can be significantly more accurate and faster than other techniques.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the specification and appended claims the term "true shape" or "true image" refers to an accurate and undistorted representation of an element. A "true shape" or "true image" is contrasted with a distorted shape which appears in a degraded image. As used in the specification and appended claims, the term "digital image" is used broadly to include any image which can be manipulated by a computing device. For example, the data produced when an image taken by a film camera is scanned is a "digital image."

FIGS. 1A-1B, 2A-2B, 3A-3E, and 4, use barcode images which are taken by a mobile device to illustrate the principles described herein. However, the application of these principles are not limited to these or other examples given in the below.

A barcode is an optical machine-readable representation of data which is used for product and service identification, for inventory tracking, or to provide other information. Typical barcodes are linear or two dimensional images which are printed on a contrasting background. In the past, dedicated barcode readers were used to scan and decode the barcodes. As general purpose color cameras, particularly in mobile devices, become less expensive and more widely available, it can be both efficient and convenient to use these color cameras to image barcodes. The color imaging data can then be processed to decode the barcode. However, the color imaging sensors in the general purpose cameras are no specifically adapted to barcode imaging. For example, the general purpose cameras may not be stable, in focus, or provide ideal lighting.

The specification discloses methods to improve the decoding robustness barcode images using optical character recognition of text contained in an image with a barcode. By leveraging information derived from text, the barcode image can be more quickly and accurately recognized. As, discussed above, barcode images taken with mobile devices are often not highest quality, in the best light, or taken with imagers which are particularly adapted to bar code scanning. By combining other data within the image which associated with the barcode, additional information can be derived to compensate for less than optimal images of the bar code. For example, optical character recognition text associated with the barcode can be used to identify and quantify distortion, blurring, or motion induced shifts in barcode images. This information can be used to compensate for artifacts in the barcode image which render the actual barcode markings difficult or impossible to decode. Further, the information derived from the text of the barcode can be used for error checking the decoded markings.

FIG. 1A is a diagram of an illustrative barcode system (100) which includes an imaging device (105) which uses an integral camera to produce an image (120) of a barcode (115) placed on a product (110). As discussed above, a barcode (115) can include a number of elements, including optical machine-readable barcode marks (114) and associated text (112). In many cases, the associated text (112) is a direct alpha numeric representation of data encoded into the barcode marks (114).

Figure 1B:
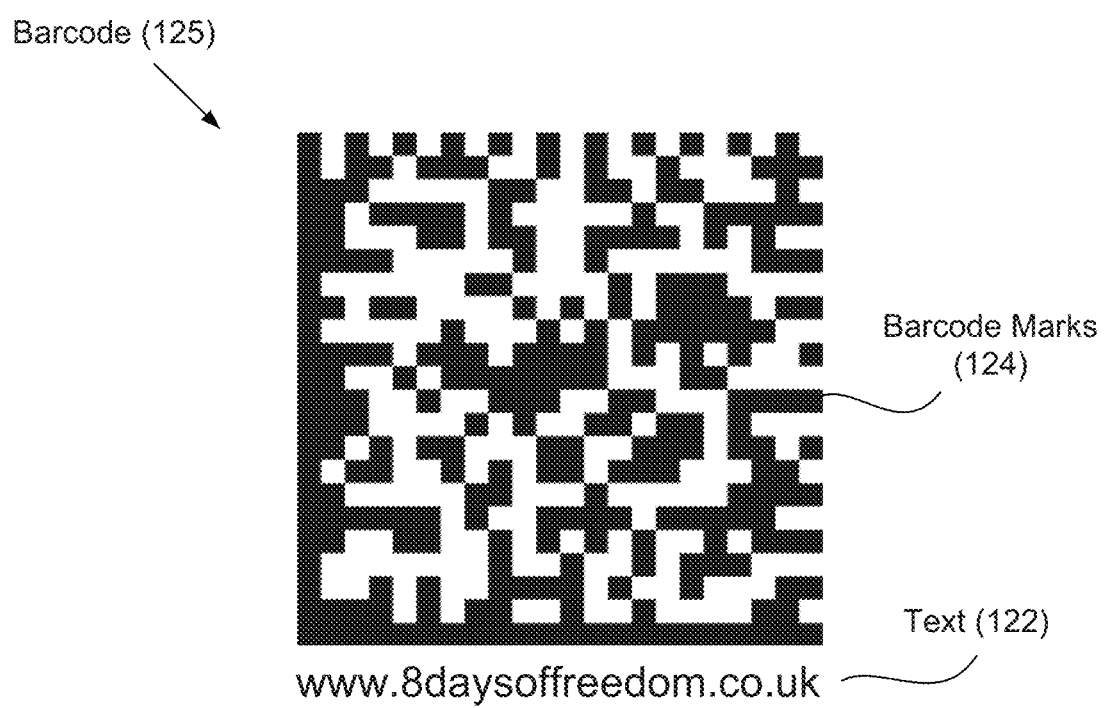
FIG. 1B is a diagrams of a two dimensional barcode which incorporates text, according to one embodiment of principles described herein.

FIG. 1B is a diagram of a two dimensional barcode (125) with associated text (122). Two dimensional barcodes typically made up of a matrix which features square or dot-shaped barcode marks (124) arranged in a grid pattern.

Many of these two dimensional barcodes are configured to be scanned using an image based scanner. The two dimensional barcodes may hold more data or represent a more complex symbolic system than the linear barcode (115) shown in FIG. 1A.

By using a mobile device as a barcode scanner, the user does not have to purchase or manage additional barcode scanning equipment. The incremental cost of providing the mobile devices with software which analyzes imaged data to decode barcode images is low. Further, the mobile device can use its existing connectivity, memory storage, and processing capability to provide value added services. For example, a data decoded from a barcode by a mobile device may be transmitted via the mobile device's wireless or cellular connection to a remote server which hosts traceability or supply management software. Additionally, the mobile device may access and present data related to the scanned product to the user in real time. For example, the mobile device may return data related to the products contents and origin, product recalls or safety issues, expiration date, current amount of inventory available, competitor pricing, or other information. Recently, two dimensional barcodes have been incorporated directly into advertisings and billboards. These two dimensional barcodes are specifically designed to be imaged using mobile device cameras. For example, the two dimensional barcode shown in FIG. 1B may include a website address. By imaging the two dimensional barcode, the user's mobile device will be directed to the appropriate website. The user can then interact with the content on the website using their mobile device.

However, the imaging sensors in the general purpose cameras are not specifically adapted to barcode imaging. In general, barcodes are designed to be read by dedicated barcode scanners which scan or image the barcode under controlled lighting and imaging conditions. For example, a barcode scanner may illuminate a barcode with monochromatic red light and use a detector or detector array to sense the reflection of the red light off the barcode. In this situation, the detector can be tuned to maximize its sensitivity to the red light which illuminates the barcode and ignores other wavelengths of light. Additionally, the barcode is often in close proximity to the barcode scanner when it is read. This minimizes the variations in lighting conditions and imaging distance.

In contrast, general purpose imaging sensors are designed to take full color images in a variety of lighting situations and over a large range of distances. This can lead to wide variations in the size and image quality of a barcode image produced by mobile device. For example, a mobile device user may take an image of a barcode in poor lighting conditions, at varying distances, while the mobile device is moving, or when the focus of the camera is not targeting the barcode. These and other conditions can degrade the image quality and/or introduce noise into the image.

Figure 2A:
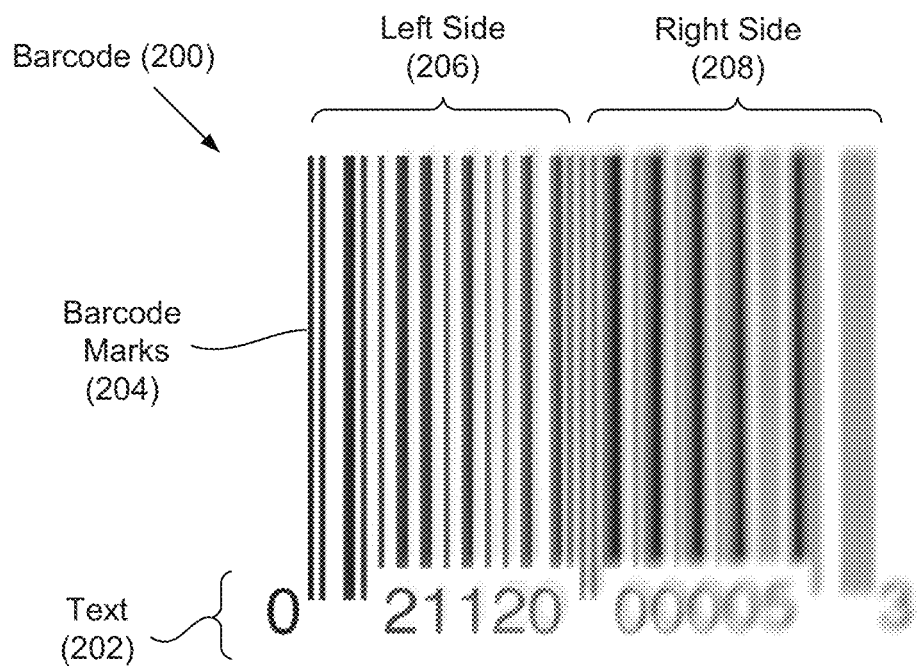
FIGS. 2A and 2B are images of barcodes in which not all of the barcode lines are directly decodable, according to one embodiment of principles described herein.
Figure 2B:
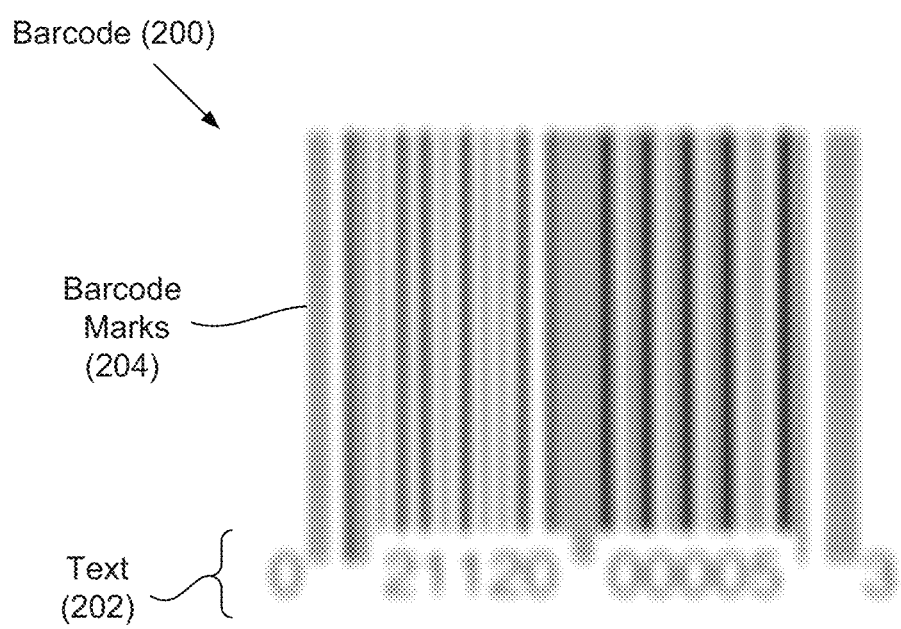

FIGS. 2A and 2B are diagrams of barcode images in which not all of the barcode lines are directly decodable. In FIG. 2A, a barcode (200) has been imaged by an imaging device. While the barcode marks (204) on the left side (206) of the image are readily decodable, the barcode marks (204) on the right side (208) may not be directly decodable. The barcode marks (204) on the right side (208) have been blurred and/or smeared within the image. Automated barcode reading relies on being able to distinguish between the black barcode marks (204) and the white background. Further, the automated barcode reading algorithm must be able to distinguish between thick barcode marks and the thin barcode marks. Thus blurring, smearing or other image degradation characteristics which combine barcode marks or render the barcode marks indistinguishable from the background can result failure of the algorithm to correctly interpret the barcode. The image degradation of the right side (208) may be caused by a variety of factors, including fingerprints on the lens of the camera, partial obstruction of the barcode by an item in the near field, poor lighting, poor focus, poorly manufactured optics, focal plane malfunctions, motion of the camera, or a variety of other issues. Text (202) is along the bottom portion of the barcode image (200). In this case, the text is a direct numeric representation of the barcode marks (204).

FIG. 2B shows the same barcode (200) with the complete image being degraded. In this example, the degradation is slightly greater than that shown in FIG. 2A. For example, the three thin vertical lines on the extreme right of the barcode were almost distinguishable in FIG. 2A. However, in FIG. 2B, the three thin vertical lines on the right of the barcode have been blurred into a single gray band. Consequently, a standard barcode reader or barcode algorithm would be unable to decipher the barcode (200). The text (202), while also more degraded, is still identifiable to the human eye. To allow the barcode to be automatically read, additional steps would have to be taken. For example, the item the barcode is affixed to could be retrieved and another picture of the barcode taken. The lighting, focus, and position of the item could be adjusted. Hopefully, the barcode image in this subsequent attempt would be improved. Alternatively, as is commonly done at cash registers when the barcode reader fails to correctly read a barcode, the human operator could read the text (202) and manually enter the digits. Each of these actions consumes valuable human time, effort, and problem solving.

The Applicants have discovered that text associated with barcodes may be less vulnerable to a number of image degrading factors than the barcode itself. As discussed above, the image degradation may include blurring, smear, motion related artifacts, focus issues, and other challenges which are particularly prevalent when imaging barcodes with mobile devices. The textual characters may be less vulnerable to these image degradation characteristics for a variety of reasons. For example, the text has a two dimensional shape which has a variety of reference points, such as curves, spacing, corners, and interior regions which allow the characters to be individually identified. While the blurring may degrade all or a portion of these characteristics, the combination of the remaining characteristics may still provide enough information for the characters to be recognized. In contrast, barcodes typically have a very limited number of characteristics, each of which must be successfully interpreted to correctly decode the barcode. For example, to successfully interpret some linear barcodes, the lines must be distinguished from the background, the width of the lines must be identified, and the spacing between the lines must be determined. Linear barcodes may be particularly vulnerable to blurring or smearing in horizontal direction (perpendicular to the long axis of the barcode marks). Consequently, in a number of situations, character recognition of text associated with the barcode may be more robust in a degraded image than decoding the barcode marks.

Figure 3A:
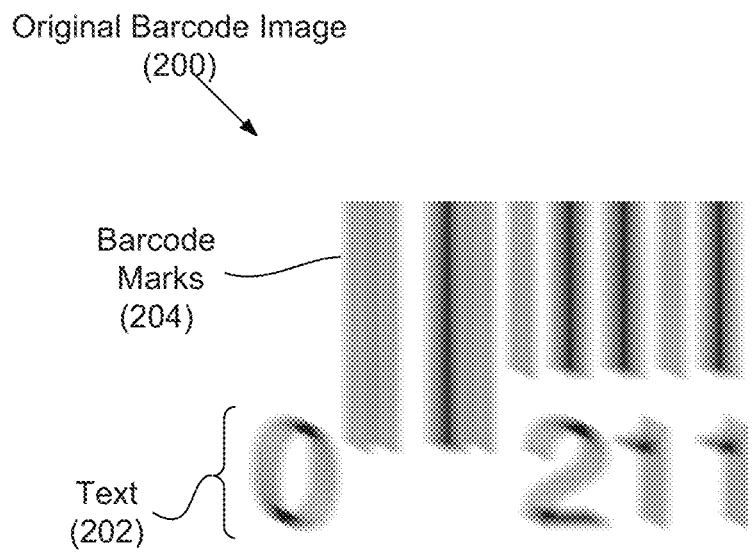
FIGS. 3A-3F illustrate a method for improving images using optically recognized characters as the basis for deconvolution, according to one embodiment of principles described herein.

To increase the robustness of barcode recognition from images, the Applicants have developed a number of techniques for leveraging information contained in recognizable text to assist in the interpretation of the barcode marks. FIGS. 3A through 3E show several of these illustrative techniques. FIG. 3A shows an image of a portion of a barcode (200) which includes barcode marks (204) and text (202). If a human observer were to look at the image as a whole, they may find the image fairly satisfactory. However, because the barcode decoding relies on distinguishing closely spaced barcode marks, the algorithm may be unable to successfully decode the barcode marks (204).

According to one illustrative embodiment, the Applicants have applied Optical Character Recognition (OCR) to the text (202) associated with the barcode (200) to assist in the decoding effort, OCR refers to automated character recognition of written or printed characters. In general, OCR algorithms analyze the text character by character. For each character, the OCR algorithm identifies various sequential lines, curves, corners, and shapes which make up the character. The OCR algorithm then makes a "best guess" to interpret the character by comparing the identified characteristics of the shape with a database of lookup tables. OCR also relies on the quality of image to provide at least a minimum of amount of accurate and distinguishable information related to each character. However, because of the nature of the characters, OCR techniques can be significantly less sensitive to sonic forms of image degradation than barcode algorithms.

Figure 3B:
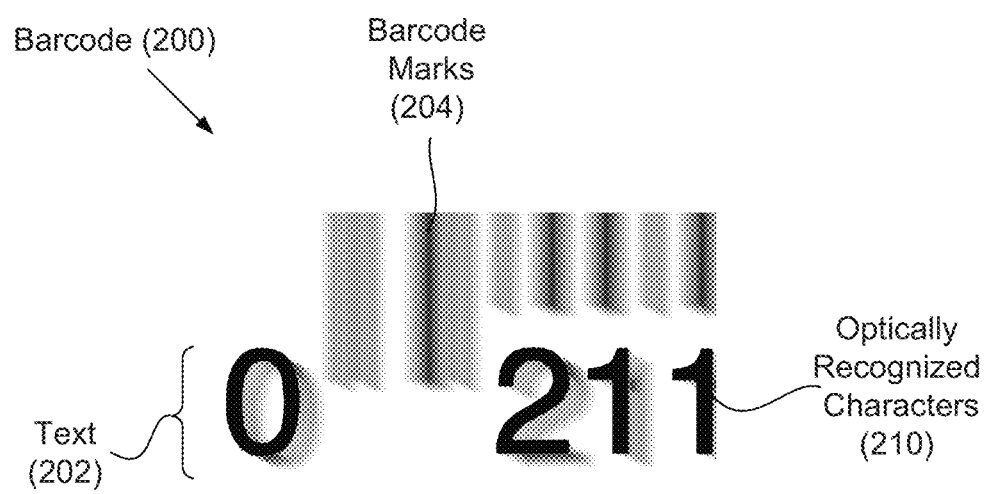

FIG. 3B shows optically recognized characters (210) which have been placed over each character in the image. In this case, the OCR algorithm has correctly identified the numbers "0211." According to one illustrative embodiment, the optically recognized characters (210) may be sufficient to interpret the meaning of the barcode alone. However, the algorithm becomes more robust if the optically recognized characters (210) in combination with the underlying representations of the characters in the image can be used to identify one or more image degrading characteristics. In some cases, these image degrading characteristics can be compensated for, and an improved image produced. This improved image may be then be analyzed by the barcode algorithm to decode the barcode. If the barcode algorithm is successful, the decoded information may be checked against the optically recognized characters (210).

According to one illustrative embodiment, the optical deconvolution can be used to reverse the optical distortion of the barcode image. The optical deconvolution algorithm assumes that a "true image" is distorted by degrading function and a noise function. Thus, a barcode image as taken by an imager may be represented by the following function.

$$a(x,y) = t(x,y) \otimes d(x,y) + n(x,y) \quad \text{Eq. 1}$$

Where:
a(x,y)=the barcode image taken by the imager
t(x,y)=the true image
d(x,y)=the degrading function
n(x,y)=the noise function
$\otimes$=the convolution operation The true two dimensional image t(x,y) represents an ideal image obtained from the scene. The degrading function d(x,y) represents the alterations of the ideal image by all sources except for noise sources. Examples of degrading functions include point spread functions which account for motion blur, lack of focus, optical aberrations, and other functions. The noise function, n(x,y), is included for completeness and represents added random or Gaussian noise. The noise function is not further discussed.

The goal of deconvolution is to reverse the effects of the degrading function to recover the true image. However, the fundamental problem of deconvolution is that only the actual image a(x,y) is typically known, This leads to a "blind deconvolution" which is analogous to solving an unconstrained equation with two unknowns. Solving "blind deconvolutions" is both computationally intensive and unreliable. For example, iterative blind deconvolutions can be performed by guessing degrading functions. The results of the blind deconvolution are then measured and the next guess is made.

In practice, a great deal of effort is used to avoid blind deconvolution by characterizing optical systems, environments, and operating conditions to discover one or more degrading functions. This may be effective in extremely controlled environments such as optical astronomy. However, in dynamic environments where images are taken by a range of users and with a wide variety of mobile devices, determining degrading functions in advance can be extremely challenging.

The Applicants have discovered that if one or more textual characters in an image can be correctly identified by an OCR algorithm, the optically recognized characters can represent a portion of the true image t(x,y). The degrading function d(x,y) can then be calculated based on the differences between the true image (as represented by optically recognized characters) and the actual image a(x,y) (as represented by the underlying image of the characters in the image). Thus, the degrading function d(x,y) is estimated from only the portions of the image from which characters were optically recognized. This degrading function d(x,y) can then be deconvolved with the larger image to dramatically improve the image. The calculated deconvolution function is also known as the kernel. As used in the specification and appended claims the term "textual characters" refers broadly to alpha numeric characters, symbols, scripts or other characters which communicate meaning.

Figure 3C:
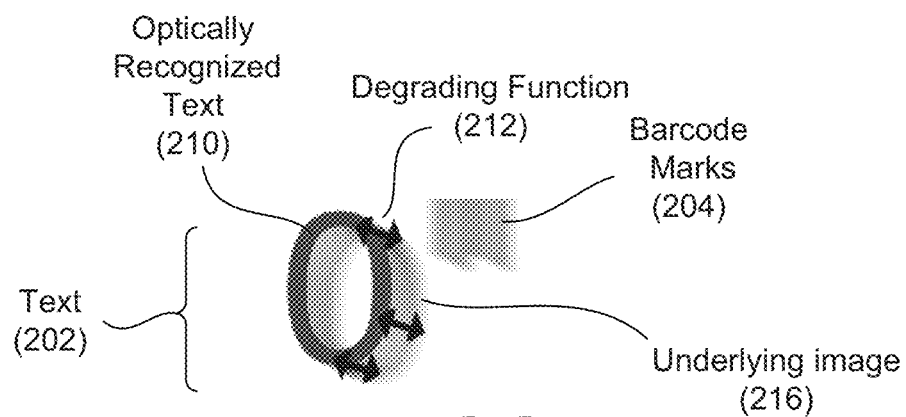
Figure 3D:
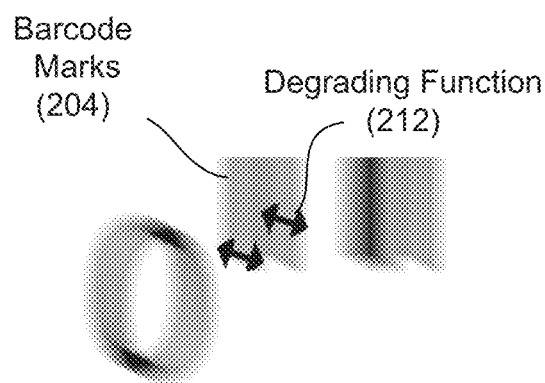
Figure 3E:
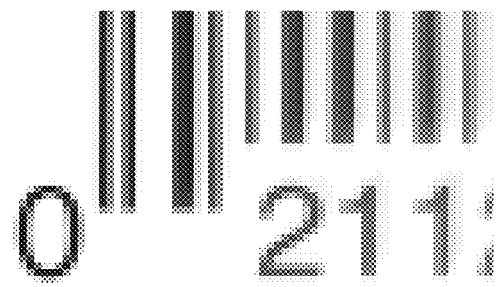

FIGS. 3C through 3E show illustrative steps in this process as applied to a barcode image. In FIG. 3C, the OCR algorithm has correctly identified the optically recognized text "0". The degrading function (212) is then determined based on difference between the underlying image (216) of the "0" and the optically recognized "0". According to one embodiment, a variety of factors could be extracted from the optically recognized character and the underlying image. These factors could be fed into a deconvolution filter. For example, these factors could include the motion blur angle, blur distance, blur path or other factors. In one example, the comparison between the optically recognized character and the underlying blurry image can be performed using a Fast Fourier Transform (FFT) operation. This will produce the kernel or point spread function which quantifies the degrading function d(x,y).

FIG. 3D shows that the degrading function (212) is also applicable to the broader image, including the barcode marks (204). In some images, where the degrading function varies over the image, the degrading function (212) may be particularly applicable to areas of the image which are closest to the recognized character(s).

Figure 3F:
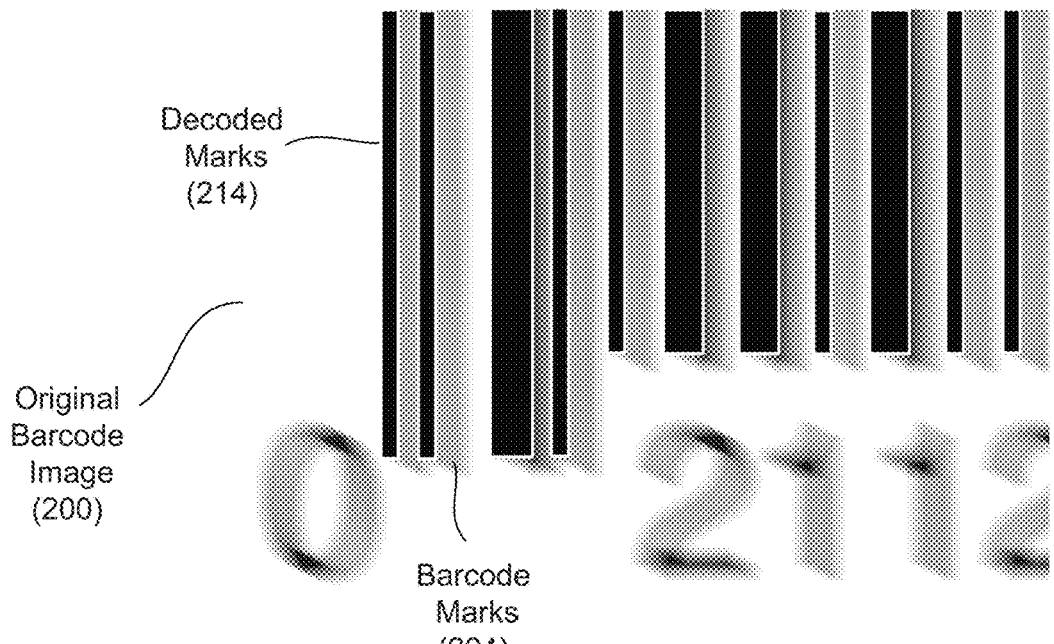

FIG. 3E shows the deconvolved image (218) which is produced after the degrading function is deconvolved from the original image (200, FIG. 3A). The deconvolved image (218) is not a perfect reproduction of the "true image" because of data which was not captured in the original image (200, FIG. 3A) or was lost in the deconvolution process. However, the deconvolved image (218) has significantly reduced the blur in the image, FIG. 3F shows that the barcode algorithm was successfully able to decode the barcode marks (204). The decoded marks (214) are illustrated by overlaying them on barcode marks (204) in the original image (200).

The sequence illustrated above illustrates a simple case of deconvolution. The deconvolution kernel was calculated for only one character and the kernel was applied to portions of the image which immediately surround the character. However, multiple characters can be recognized and a kernel calculated for each character. The various kernels can then be applied to the portions of the image closest to the associated character. Additionally, the kernels could be combined into an overall kernel which accounts for the degrading function over a broader area of the image.

In some embodiments, the deconvolution kernel could be extrapolated to cover the entire image or interpolated between adjacent deconvolution kernels. For example, if an image has text at a focal length of X (the foreground for example) and text at focal length of Y (the background for example), the X kernel and Y kernel will be different. However, the X kernel and Y kernel will be suitable for other objects which are at their respective focal lengths. One example this situation may be an image with both a nearby billboard and a more distant billboard. A small scale example may be a barcode where the camera lens was at an angle to the barcode. The left part of the barcode maybe in focus while the right part is not. The kernel of the left part would produce minimal changes whereas on the right, the kernel would produce a substantial amount of sharpening in the image. To improve the barcode image over its length, interpolations between the left kernel and the right kernel could be made and applied using deconvolution.

For a given image barcode image, the algorithm may not be able to extract the complete information barcode. However, whatever information can be extracted can be used. For example, the algorithm may be able to identify textual characters, but unable to decode the barcode. In this case, the textual characters could be used to identify the product or perform other functions. The converse is also true. If the barcode can be decoded but the text cannot, the barcode information can be used to correct or supplement the OCR process. in cases where neither the text nor the barcode is completely decoded, the information from the text and barcode can be combined to fill in the gaps. Redundant information can be used for cross verification, if both the text and barcode agree on particular points, the confidence in those points can be significantly higher. Combinations of correctly recognized alpha numeric characters and barcodes marks could also be used as a basis for deconvolution.

Figure 4:
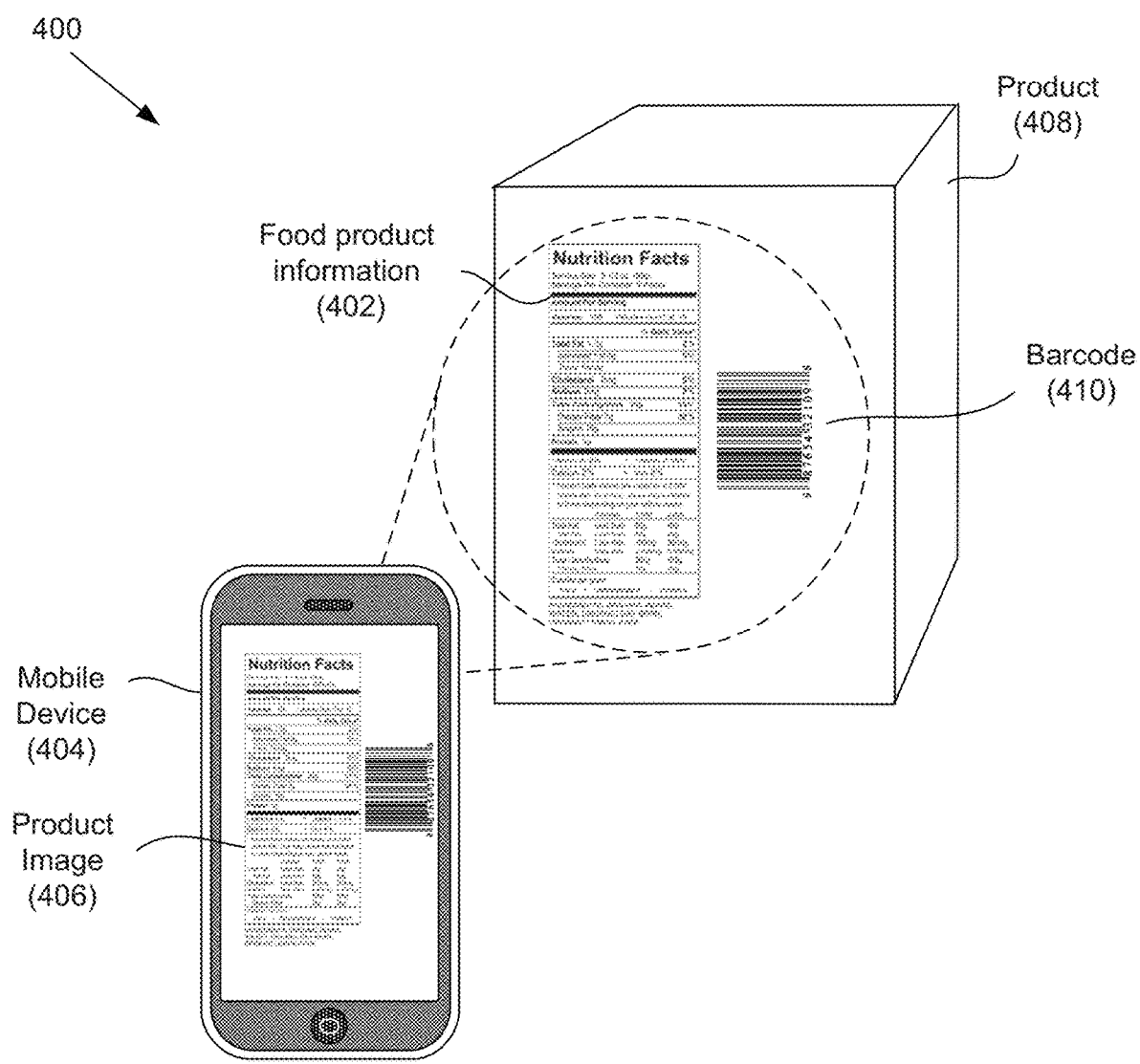
FIG. 4 is diagram of an imaging system which uses optically recognized text which is not directly related to a barcode to improve an image, according to one embodiment of principles described herein.

To this point, the use of optically recognized characters to discover degrading functions in images has been illustrated using barcodes. However, the technique can be used in a wide range of applications where characters can be optically recognized in an image. For example, FIG. 4 shows a scanning system (400) which includes a mobile device (404) which images a product (408). The mobile device (404) images both a barcode (410) and food product information (402) on the side of the box. The OCR algorithm may be used to detect printed characters or other indicia in any part of the product image (406). This can lead to more robust deconvolution of the image. For example, if the image is particularly poor, the OCR algorithm may select large characters in a known font. In this example, the words "Nutrition Facts" are large, dark letters with a font and size which is standardized across food product packaging in the United States by the Food and Drug Administration (FDA), Consequently, these characters may be more easily identified by the OCR algorithm than smaller text elsewhere in the image. The degrading function can then be determined as described above and the image can be deconvolved to improve its quality. In some embodiments, multiple deconvolution steps can be used. For example, a first deconvolution may be performed using the words "Nutrition Facts." This may improve the image enough that the numbers associated with the barcode can be optically recognized and used to perform a second deconvolution of the barcode image.

Figure 5:
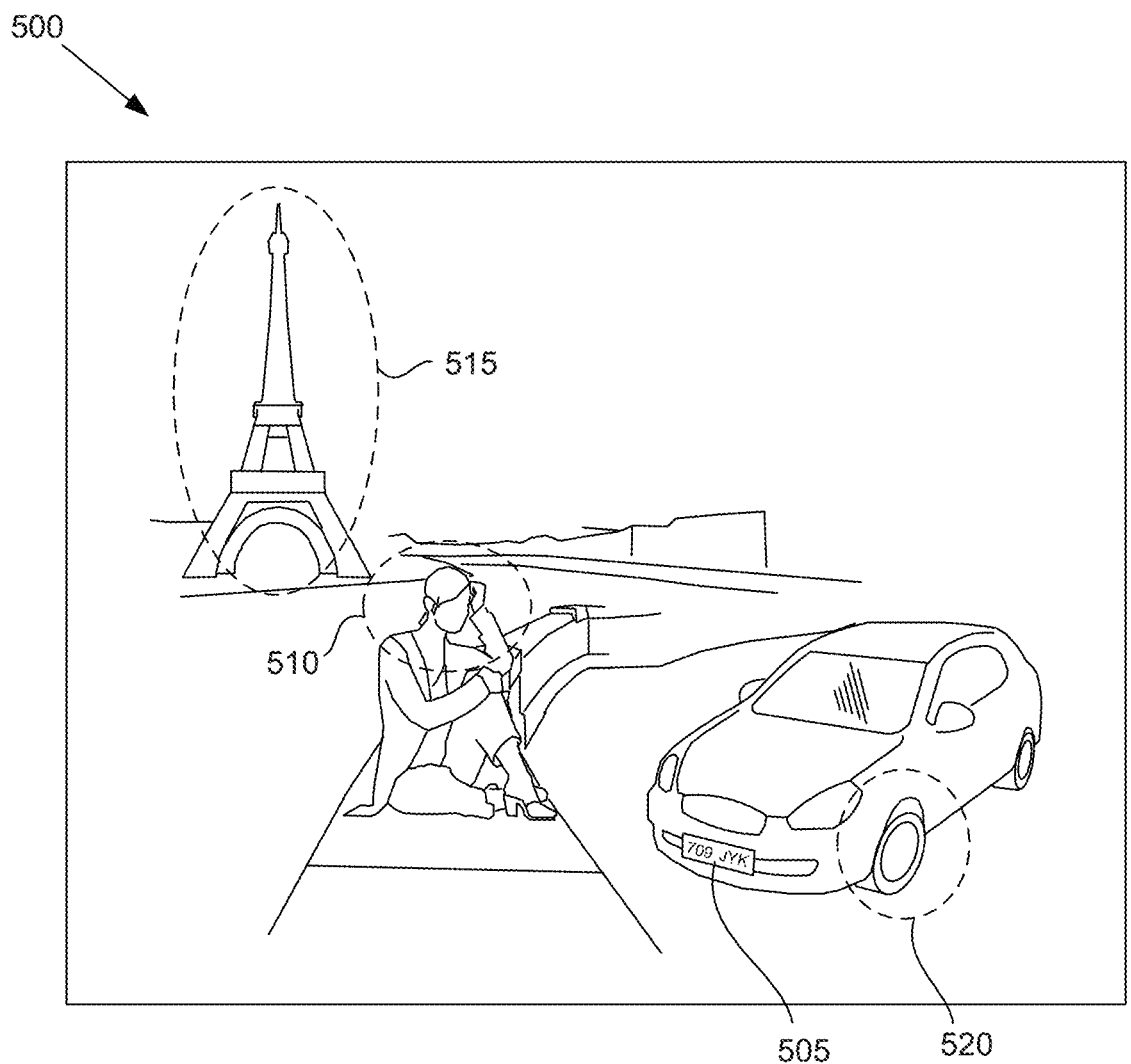
FIG. 5 is a photograph which contains optically recognizable characters, according to one embodiment of principles described herein.

The method of recognizing text using OCR techniques and then extracting a degrading function based on the difference between the recognized text and the underlying image can be also be used in applications such as surveillance, law enforcement, or photography. FIG. 5 is a photograph (500) of a landscape which includes landmark, person, and a car. The license plate (505) of the car contains a number of characters which could be optically recognized and used to improve the quality of the overall picture.

In some embodiments, more advanced algorithms could be used to extract degrading functions and perform deconvolutions. For example, any algorithm which can derive a "true image" from an actual image could be used. In one embodiment, a facial recognition could be used to match a face (510) in an image with a known face from a library. The difference between the face (510) in the image and the known face could then be used to extract a degrading function and perform deconvolutions. Additionally or alternatively, other shapes (515, 520) which have known characteristics could be recognized and used as a basis for deconvolution.

Figure 6A:
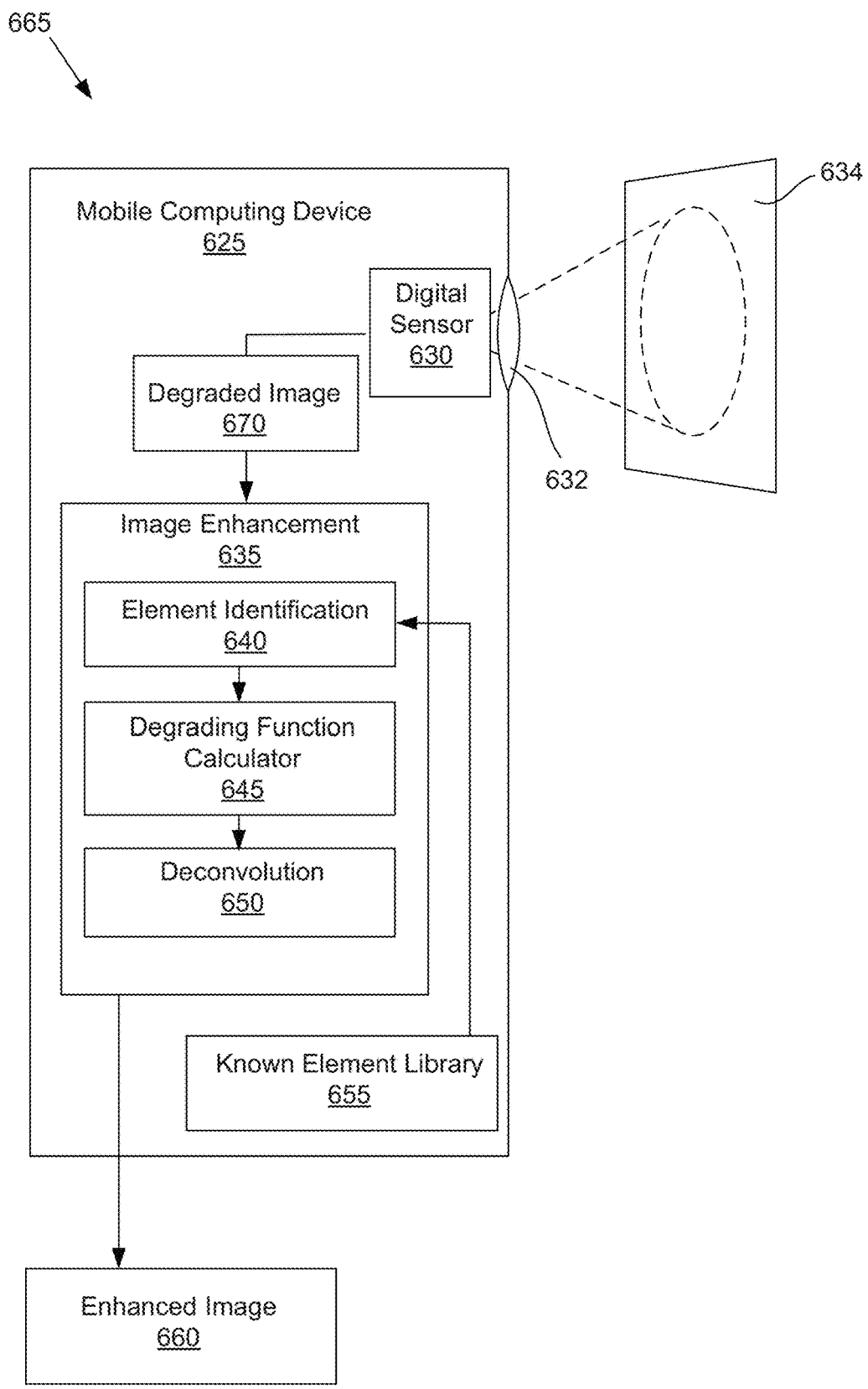
FIGS. 6A and 6B are a system and method, respectively for deconvolution of digital images, according to one embodiment of principles described herein.

FIGS. 6A is a diagram of an illustrative system (665) for enhancing the quality of a degraded image (670). In this example, a mobile computing device (625) with an integral digital sensor (630) acquires a degraded image (670) of a scene (634). In practice, most images have some amount degradation due to the physical limitations of systems which acquire the images. For example, the degradation may be due to the optics (632), limitations of the optical sensor (630) used to acquire the image, lack of focus, motion of the subjects during the exposure, motion of the camera, or other factors.

A mobile computing device (625) is used as an illustrative system in this example. However, a wide variety of different systems could be used to acquire the degraded image (670) of the scene. For example, the image (670) could be separately acquired and then sent over a network to a server for processing, storage, and distribution. The degraded image (670) is passed to an image enhancement module (635) which contains an element identification module (640), a degrading function calculator (645) and a deconvolution module (650). The element identification module (640) recognizes a distorted element within the degraded image (670). The distorted element may be any element which is recognized by the system and has undistorted data in the known element library (655). For example, the distorted element may be a written or printed character, a known face, a shape, or other element. The distortion in the element may be manifest in any of a number of ways, including blurring, smearing, shifting, lens distortion, or ghosting of the shape within the image. The known element library may contain alpha numeric characters in a plurality of fonts, known faces, textual characters, or other undistorted shapes which can be referenced as "true images".

The degrading function calculator (645) uses the distorted image and the undistorted data from the known element library (655) calculate a degrading function. As discussed above, the distorted image may be a printed character, face, or other element which is blurred and smeared in the degraded image (670). By comparing the distorted image with an undistorted image retrieved from the known element library, the calculator (645) can quantitatively define a degrading function.

The deconvolution module (650) deconvolves the degrading function from all or a portion of the degraded image (670) to produce the enhanced image (660). For example, if the image has been blurred and shifted, the deconvolution of the degrading function will minimize the effects of this degradation.

Figure 6B:
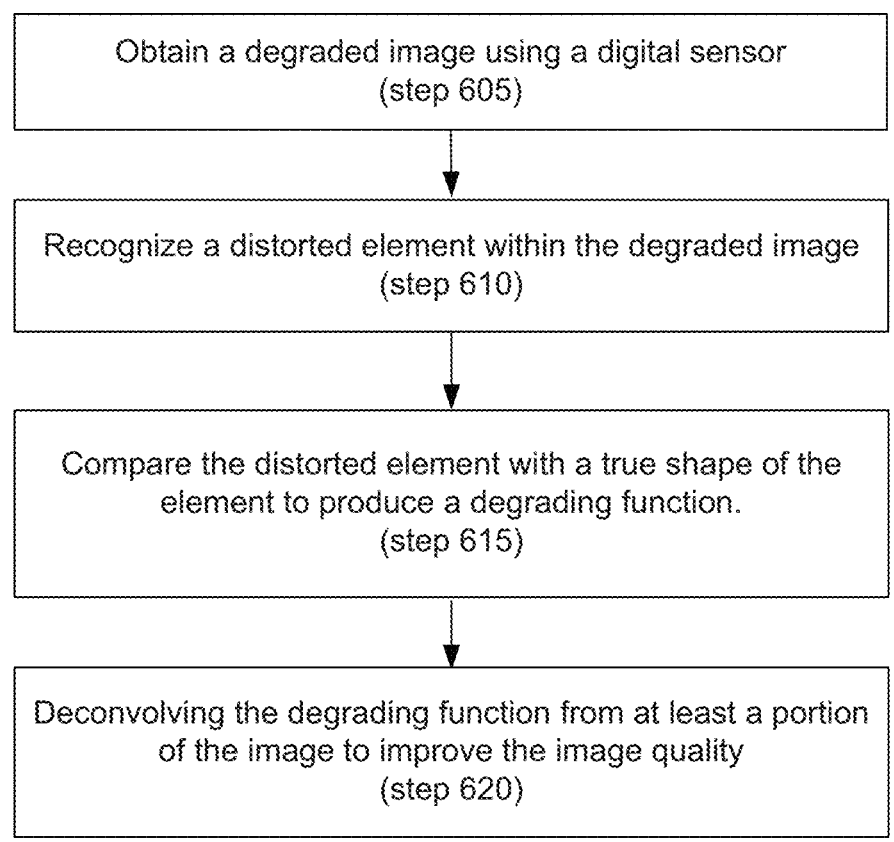

FIG. 6B is a flow chart which summarizes one embodiment of a method for enhancing the quality of a degraded digital image using deconvolution. A degraded image is obtained (step 605) using a digital sensor. The output of the digital sensor is accepted by a processor. A distorted element is recognized within the image (step 610) using the processor. A degrading function is produced by comparing the distorted element with a "true" or undistorted shape of the element (step 615). The degrading function is deconvolved from at least a portion of the image to improve the quality of the degraded image (step 620).

The systems and methods described above could be applied in a variety of imaging situations and applications. For example, the systems and methods could be applied to video streams. A first video frame may have a recognizable shape, image, and/or a defined boundary/outline. This video frame may be improved using the techniques described above. Because video frame rates are relatively rapid and changes between the frames can be minimal, a deconvolution kernel extracted from a frame could be advantageously used in subsequent or previous frames. In some embodiments, subsequent kernels may be calculated for other frames. The deconvolutions for video frames between the frames with calculated kernels could be interpolations between the calculated kernels. It may also be beneficial to extrapolate beyond the boundaries of calculated kernels to provide deconvolution which covers more spatial or temporal space. In some embodiments, a physical model which approximates the mass, speed, and inertia of the imaging system could be used to more accurately predict or interpolate the deconvolution kernels. This technique could improve the accuracy of the deconvolutions spatially and temporally.

In some embodiments, objects which are clear in one frame could be transferred to previous or subsequent frames which contain a blurred image of the object. The clear image of the object could then serve as the "true image" and the difference between the clear image and the underlying blurred image could be used to create the deconvolution. Thus, the source of the "true image" may come from another related frame of the video.

Other examples may include removing blur caused by object motion within an image or video sequence. For example, a picture or video of a Tour de France cyclist may include a sharp background, but the cyclist may be a blur. The deconvolution kernel could be calculated using the difference between the reference background and the blurred object in motion (the cyclist). The deconvolution could result in an image with a blurred background and a clear cyclist. In other embodiments, the clear background in the image and the deconvoluted object in motion could be combined to produce improved image.

In sum, image quality can be improved by extracting a degrading function and deconvolving the degrading function over the image. The degrading function can be determined by comparing an optically recognized element from the image with the underlying blurry image. This allows for direct determination of a degrading function which can be used to compensate for image degradation caused by a number of factors including lack of focus, camera movement, or subject movement. Direct determination of the degrading function eliminates the need for less effective blind deconvolution schemes and allows for fast, accurate image correction.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for image enhancement by deconvolution, the computer program product comprising:
   a non-transitory computer readable storage medium having computer readable program code embodied therewith, the computer readable program code comprising:

computer readable program code configured to obtain a degraded image by causing a processor to accept a digital representation of the degraded image;

computer readable program code configured to recognize distorted text within the degraded image by using the processor to perform optical character recognition on the distorted text to produce an optically recognized character;

computer readable program code configured to then compare the optically recognized character with the distorted text from which the optically recognized character was recognized to produce a degrading function; and computer readable program code configured to apply the degrading function to at least a portion of the degraded image to improve image quality of the degraded image.

2. The computer program product of claim 1, wherein the computer readable program code configured to apply the degrading function to at least a portion of the degraded image comprises computer readable program code configured to deconvolve the degrading function with respect to the portion of the degraded image to improve image quality of the degraded image.

3. The computer program product of claim 2, in which the degrading function quantifies an image blur path and distance.

4. The computer program product of claim 1, further comprising computer readable program code with which a first degrading function is calculated at a first location in the degraded image and a second degrading function is calculated at a second location within the degraded image.

5. The computer program product of claim 4, in which deconvolution of portions of the image between the first location and second location are made by interpolating the first degrading function and the second degrading function.

6. The computer program product of claim 4, further comprising computer readable program code configured to extrapolate from the first and second degrading functions to cover areas of the degraded image which are beyond both the first location and second location.

7. A system for improving image quality of digital images comprising:
a processor; and
a memory to provide instructions to the processor;
wherein the processor, when executing the instructions performs:
obtaining a degraded image, the processor accepting a digital representation of the degraded image;
recognizing distorted text within the degraded image by the processor performing optical character recognition on the distorted text to produce an optically recognized character;
then comparing the optically recognized character with the distorted text from which the optically recognized character was recognized to produce a degrading function; and
applying the degrading function to at least a portion of the degraded image to improve image quality of the degraded image.

8. The system of claim 7, wherein applying the degrading function to at least a portion of the degraded image comprises the processor deconvolving the degrading function with respect to the portion of the degraded image to improve image quality of the degraded image.

9. The system of claim 7, in which the degrading function quantifies an image blur path and distance.

10. The system of claim 7, in which a first degrading function is calculated at a first location in the degraded image and a second degrading function is calculated at a second location within the degraded image.

11. The system of claim 10, in which deconvolution of portions of the image between the first location and second location are made by interpolating the first degrading function and the second degrading function.

12. The system of claim 10, further comprising extrapolating from the first and second degrading functions to cover areas of the degraded image which are beyond both the first location and second location.

13. The system of claim 7, wherein:
the degraded image comprises a photograph of a scene that includes written text; and
the processor, when executing the instructions, performs recognizing of the written text in the photographed scene as the distorted text to be optically recognized.

14. The system of claim 7, wherein:
the degraded image comprises a photograph comprising a human face; and
the processor, when executing the instructions, recognizes the human face in the photograph, matches the face from the photograph to a known face in a library and updates the degrading function based on a difference determined by comparison of the face from the photograph and the known face from the library.

15. The system of claim 7, wherein:
the degraded image comprises a photograph comprising a landmark; and
the processor, when executing the instructions, recognizes the landmark in the photograph, matches the landmark from the photograph to a known landmark in a library and updates the degrading function based on a difference determined by comparison of the landmark from the photograph and the known landmark from the library.

16. A computer program product for indirectly decoding a barcode by deconvolution of a digital image, the computer program product comprising:
a non-transitory computer readable storage medium having computer readable program code embodied therewith, the computer readable program code comprising:
computer readable program code configured to recognize distorted text within a degraded image that comprises both a barcode and the distorted text, wherein recognizing the distorted text comprises performing optical character recognition on the distorted text to produce an optically recognized character;
computer readable program code configured to compare the optically recognized character with the distorted text from which the optically recognized character was recognized to produce a degrading function;
computer readable program code configured to deconvolve the degrading function for at least a portion of the degraded image comprising the barcode to improve image quality of the barcode; and
computer readable program code configured to decode the barcode based on the improved image quality of the barcode.

17. The computer program product of claim 16, wherein producing the degrading function comprises computer readable program code configured to overlay the optically recognized character on portions of the image from which the optically recognized character was recognized.

18. The computer program product of claim 16, wherein producing the degrading function comprises computer readable program code configured to compare the optically recognized character with the distorted text using a fast Fourier transform.

19. The computer program product of claim 16, wherein producing the degrading function comprises computer readable program code configured to quantify the degrading function as a point spread function.

20. The computer program product of claim 16, wherein the distorted text is associated with the barcode in the degraded image and contains the same information that is encoded in the barcode, the product further comprising computer readable program code configured to verify information decoded from the barcode against the optically recognized character.

* * * * *